US008767532B2

(12) United States Patent
Vasseur et al.

(10) Patent No.: US 8,767,532 B2
(45) Date of Patent: Jul. 1, 2014

(54) OPTIMIZATION OF DISTRIBUTED TUNNEL REROUTING IN A COMPUTER NETWORK WITH PATH COMPUTATION AT AN INTERMEDIATE NODE

(71) Applicant: Cisco Technology, Inc., San Jose, CA (US)

(72) Inventors: Jean-Philippe Vasseur, Saint Martin dUriage (FR); Francois Le Faucheur, Valbonne (FR); Anna Charny, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/661,529

(22) Filed: Oct. 26, 2012

(65) Prior Publication Data

US 2013/0051224 A1     Feb. 28, 2013

Related U.S. Application Data

(63) Continuation of application No. 11/676,675, filed on Feb. 20, 2007.

(60) Provisional application No. 60/871,515, filed on Dec. 22, 2006.

(51) Int. Cl.
*H04L 12/26* (2006.01)

(52) U.S. Cl.
USPC ........... 370/228; 370/216; 370/217; 370/235; 370/255; 709/239; 709/240; 714/2

(58) Field of Classification Search
CPC .................................................... H04L 47/245
See application file for complete search history.

(56) References Cited

U.S. PATENT DOCUMENTS

| | | |
|---|---|---|
| 6,122,272 A | 9/2000 | Tomaszewski |
| 6,256,309 B1 | 7/2001 | Daley et al. |
| 6,370,119 B1 | 4/2002 | Basso et al. |
| 6,600,724 B1 | 7/2003 | Cheng |
| 6,628,649 B1 | 9/2003 | Raj et al. |
| 6,665,273 B1 | 12/2003 | Goguen et al. |
| 6,717,920 B1 | 4/2004 | Cheng |

(Continued)

OTHER PUBLICATIONS

U.S. Appl. No. 60/871,515, filed Dec. 22, 2006, entitled Optimization of Distributed Tunnel Rerouting in a Computer Network, by Vasseur et al., 42 pgs.

(Continued)

*Primary Examiner* — Ayaz Sheikh
*Assistant Examiner* — Nicholas Sloms
(74) *Attorney, Agent, or Firm* — Novak Druce Connolly Bove + Quigg LLP

(57) ABSTRACT

In one embodiment, a set of tunnels is determined that traverse a particular link connected to an intermediate node in a network. The intermediate node computes, in a coordinated path computation, paths for tunnels of the set of tunnels that do not include the particular link. The coordinated path computation considers each of the tunnels of the set of tunnels. The intermediate node selects one or more tunnels of the set of tunnels for preemption. The one or more tunnels are selected as tunnels that are reroutable by respective head-end nodes of the one or more other tunnels. Notifications are sent to one or more other intermediate nodes that inform the one or more other intermediate nodes of the one or more tunnels selected for preemption.

20 Claims, 9 Drawing Sheets

(56) References Cited

U.S. PATENT DOCUMENTS

| | | |
|---|---|---|
| 6,751,190 B1 | 6/2004 | Swallow |
| 6,778,492 B2 | 8/2004 | Charny et al. |
| 6,978,394 B1 | 12/2005 | Charney et al. |
| 7,031,262 B2 | 4/2006 | Vasseur et al. |
| 7,042,834 B1 | 5/2006 | Savage |
| 7,054,262 B2 | 5/2006 | Gerstel |
| 7,085,224 B1 | 8/2006 | Oran |
| 7,333,438 B1 | 2/2008 | Rabie et al. |
| 2002/0114272 A1 | 8/2002 | Stewart |
| 2002/0141345 A1* | 10/2002 | Szviatovszki et al. ........ 370/238 |
| 2003/0126287 A1 | 7/2003 | Charny et al. |
| 2003/0147352 A1 | 8/2003 | Ishibashi et al. |
| 2004/0010617 A1 | 1/2004 | Akahane et al. |
| 2004/0190528 A1* | 9/2004 | Dacosta .................. 370/395.41 |
| 2005/0117512 A1 | 6/2005 | Vasseur et al. |
| 2005/0259664 A1* | 11/2005 | Vasseur et al. ........... 370/395.52 |
| 2005/0276216 A1 | 12/2005 | Vasseur et al. |
| 2005/0276217 A1 | 12/2005 | Gadgil et al. |
| 2005/0281192 A1 | 12/2005 | Nadeau et al. |
| 2006/0039391 A1 | 2/2006 | Vasseur et al. |
| 2006/0104199 A1 | 5/2006 | Katukam et al. |
| 2006/0114818 A1 | 6/2006 | Canali et al. |
| 2006/0159009 A1 | 7/2006 | Kim et al. |
| 2006/0224589 A1 | 10/2006 | Rowney et al. |
| 2006/0250964 A1 | 11/2006 | Vasseur et al. |

OTHER PUBLICATIONS

Awduche, D., Network Working Group Request for Comments 3209, entitled "RSVP-TE: Extensions to RSVP for LSP Tunnels," IETF, Dec. 2001, pp. 1-57.

Smit, H., Network Working Group Request for Comments 3784, entitled Intermediate-System-to-Intermediate-System (IS-IS) Extensions for Traffic Engineering (TE), IETF, Jun. 2004, pp. 1-13.

Katz, D. et al, Network Working Group Request for Comments 3630, entitled "Traffic Engineering (TE) Extensions to OSPF Version 2," IETF, Sep. 2003, pp. 1-14.

Braden, R. et al., Network Working Group Request for Comments 2205, entitled "Resource ReSerVation Protocol (RSVP), Version 1 Functional Specification," IETF, Sep. 1997, pp. 1-105.

Berger, 1., Network Working Group Request for Comments 3473, entitled "Generalized Multi-Protocol Label Switching (GMPLS} Signaling Resource ReserVation Protocol—Traffic Engineering (RSVP-TE) Extensions," IETF, Jan. 2003, pp. 1-40.

* cited by examiner

| TUNNEL ID 611 | HEAD-END NODE 612 | BANDWIDTH 613 | PRIORITY 614 |
|---|---|---|---|
| T1 | A | BW.T1 | P.T1 |
| T2 | B | BW.T2 | P.T2 |
| T3 | C | BW.T3 | P.T3 |
| ... | ... | ... | ... |
| TN | N | BW.TN | P.TN |

TABLE (LINK "D-E") 600

FIELDS 610

ENTRIES 620

FIG. 6

OPTIMIZATION OF DISTRIBUTED TUNNEL REROUTING IN A COMPUTER NETWORK WITH PATH COMPUTATION AT AN INTERMEDIATE NODE

CROSS-REFERENCE TO RELATED APPLICATIONS

The present application is a continuation of U.S. patent application Ser. No. 11/676,675, which was filed on Feb. 20, 2007 by Vasseur et al. for OPTIMIZATION OF DISTRIBUTED TUNNEL REROUTING IN A COMPUTER NETWORK WITH PATH COMPUTATION AT AN INTERMEDIATE NODE and is hereby incorporated by reference. U.S. patent application Ser. No. 11/676,675 claims the benefit of U.S. Provisional Patent Application Ser. No. 60/871,515, which was filed on Dec. 22, 2006, by Vasseur et al. for OPTIMIZATION OF DISTRIBUTED TUNNEL REROUTING IN A COMPUTER NETWORK and is also hereby incorporated by reference.

TECHNICAL FIELD

The present disclosure relates generally to computer networks, and, more particularly, to rerouting of tunnels within computer networks.

BACKGROUND

Path computation for tunnels of a computer network, e.g., label switched paths (LSPs), is generally performed in a distributed manner, where each head-end node of the tunnels computes paths for its tunnels independently from head-end nodes of other tunnels. For example, tunnels in many Multi-Protocol Label Switching (MPLS) Traffic Engineering (TE) networks (e.g., MPLS TE-LSPs) are computed using a distributed constrained shortest path first (CSPF) algorithm. As those skilled in the art will understand, distributed CSPF offers high flexibility/scalability, and is well-equipped to handle frequent topology changes, dynamic traffic demands, and resource availability changes.

One problem associated with distributed path computation is that while it may be highly flexible/scalable, it may be inefficient for optimizing tunnel placement within the network, i.e., due to the lack of path computation coordination among the head-end nodes. In particular, when one or more established tunnels utilize a link that becomes unavailable to those tunnels (e.g., due to failure of the link or preemption of certain tunnels on the link for a higher priority tunnel), each of the head-end nodes corresponding to the affected tunnels generally attempt to reroute the tunnels through the network. The distributed rerouting of the tunnels may cause a burst of signaling within the network to reroute the tunnels, which may lead to signaling failures, as will be understood by those skilled in the art. Also, "preemption cascading," where one tunnel is rerouted and then preempts shortly thereafter a lower priority tunnel, which then preempts a still lower priority tunnel, etc., may occur with distributed rerouting of tunnels. In addition, if many smaller tunnels are rerouted throughout the network, those smaller tunnels may "fragment" the remaining bandwidth of the network, to the extent that even if a large amount of bandwidth is available from a source to a destination, that bandwidth may be fragmented into smaller amounts along multiple paths such that no one (acceptable) path exists upon which a large tunnel may be placed.

Further, when there is a link (or node) failure within a network, the total available bandwidth of the network is reduced. For instance, this may result in some tunnels that had been in place before the link failure not being able to find a path after the failure due to insufficient bandwidth availability of the network. For guaranteed traffic over the tunnels (e.g., voice, video, etc.), the tunnels that are able to find a suitable path may maintain the bandwidth guarantee, while other tunnels are not able to find a path, thus are unable to maintain their guarantee.

Due to the distributed nature of path computation for tunnels (e.g., distributed CSPF), it has generally not been possible to coordinate the rerouting (replacement) of tunnels in a computer network such that substantially all tunnels can be placed. In other words, it has generally not been possible to coordinate the timing, placement, and bandwidth reservation (e.g., fair bandwidth allocation) of tunnels using distributed path computation, particularly in the event of a link (or node) becoming unavailable to the tunnels, e.g., due to a failure or preemption on the link.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 6 illustrates and example table.

DESCRIPTION OF EXAMPLE EMBODIMENTS

Overview

Figure 1:
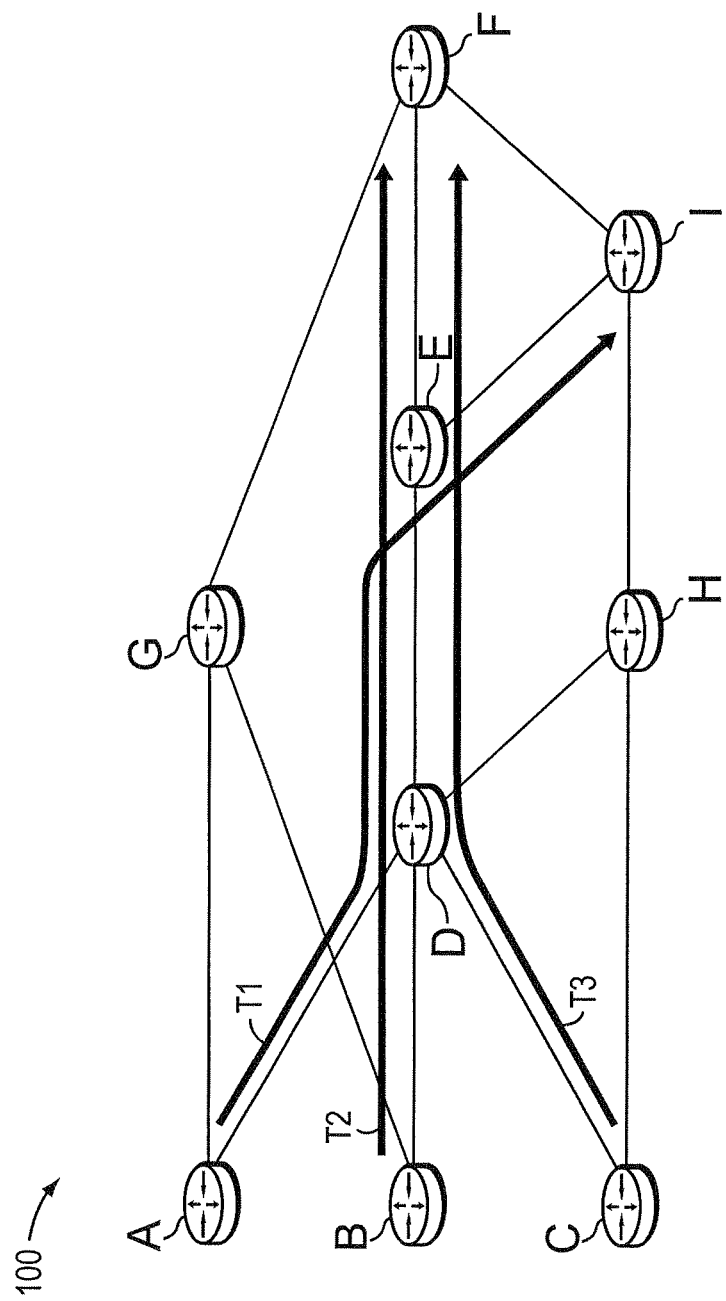
FIG. 1 illustrates an example computer network.

According to embodiments of the disclosure, an intermediate node determines a set of one or more tunnels that traverse a particular link of the intermediate node, and computes paths for the set of tunnels that do not include the particular link, the computed path for each tunnel considering each of the tunnels of the set (or alternatively a subset). The intermediate node may then inform respective head-end nodes of the tunnels of the set of the computed paths such that in the event of an inability of the set of tunnels to use the particular link, the head-end nodes may reroute their respective tunnels over the computed paths. Alternatively or in addition, the intermediate node may inform respective head-end nodes of a timestamp to reroute each of their tunnels (e.g., in which case the path is computed by the respective head-end node by contrast with the previous case where such path is computed by the mid-point).

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

FIG. 1 is a schematic block diagram of an example computer network 100 illustratively comprising nodes (e.g., routers) A-I interconnected by links as shown. Illustratively, various tunnels (not shown) may traverse the links between head-end nodes (e.g., nodes A-C) and tail-end nodes (e.g., nodes F and I), such as through one or more intermediate nodes (e.g., at least nodes D, E, G, and H), as described herein and as will be understood by those skilled in the art. Those skilled in the art will also understand that any number of nodes, routers, links (e.g., with any bandwidth values), etc. may be used in the computer network, and that the view shown herein is for simplicity. Further, those skilled in the art will also understand that while the present invention is described generally, it may apply to customer networks and provider core networks with provider (P) and provider edge (PE) routers, any network configuration within an AS or area/level, or throughout multiple ASes or areas/levels, etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
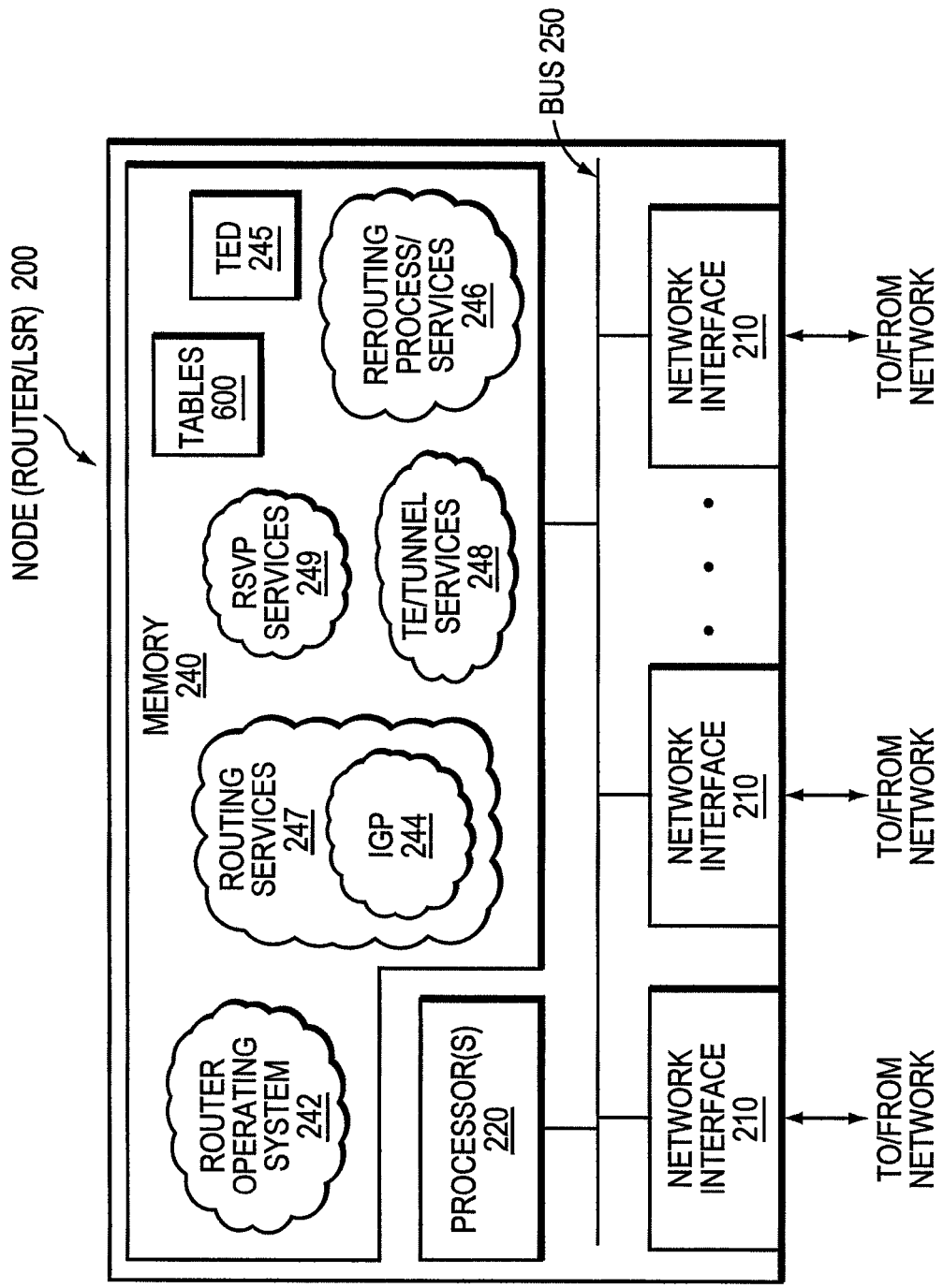
FIG. 2 illustrates an example network device/node.

FIG. 2 is a schematic block diagram of an example node/router 200 that may be advantageously used with one or more embodiments described herein, e.g., as a head-end node or intermediate node (label switched routers, "LSRs"). The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures, such as tables 600 and Traffic Engineering Database (TED) 245. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the router. These software processes and/or services may comprise routing services 247, Interior Gateway Protocol (IGP) services 244, Resource ReSerVation Protocol (RSVP) services 249, Traffic Engineering (TE)/Tunnel services 248, and as described herein, an example rerouting process/service 246. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., Open Shortest Path First, "OSPF," and Intermediate-System-to-Intermediate-System, "IS-IS") as IGP services 244, the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Changes in the network topology within the local domain (network 100) may be communicated among routers 200 within the network 100 using IGP services 244, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
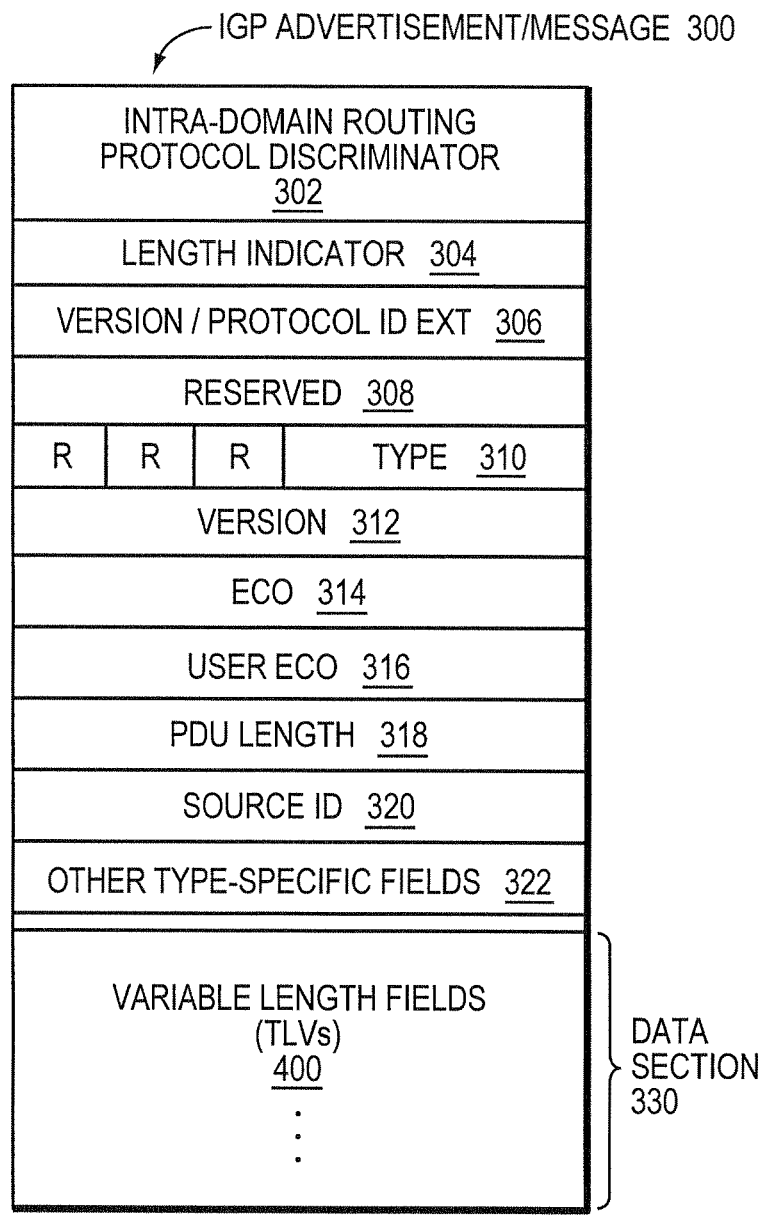
FIG. 3 illustrates an example IGP message.

FIG. 3 illustrates an example IGP advertisement 300 that may be flooded by the routers 200. Illustratively, IGP advertisement 300 is shown as an IS-IS link state packet. Those skilled in the art will understand, however, that other IGP advertisements may be used in accordance with the one or more embodiments described herein, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a link state packet, a "Hello" packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining life-time value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and one or more novel fields (e.g., sub-TLVs in a Router Capability TLV), described further below. Generally, the received IGP advertisements are stored in a link state database (LSDB) of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
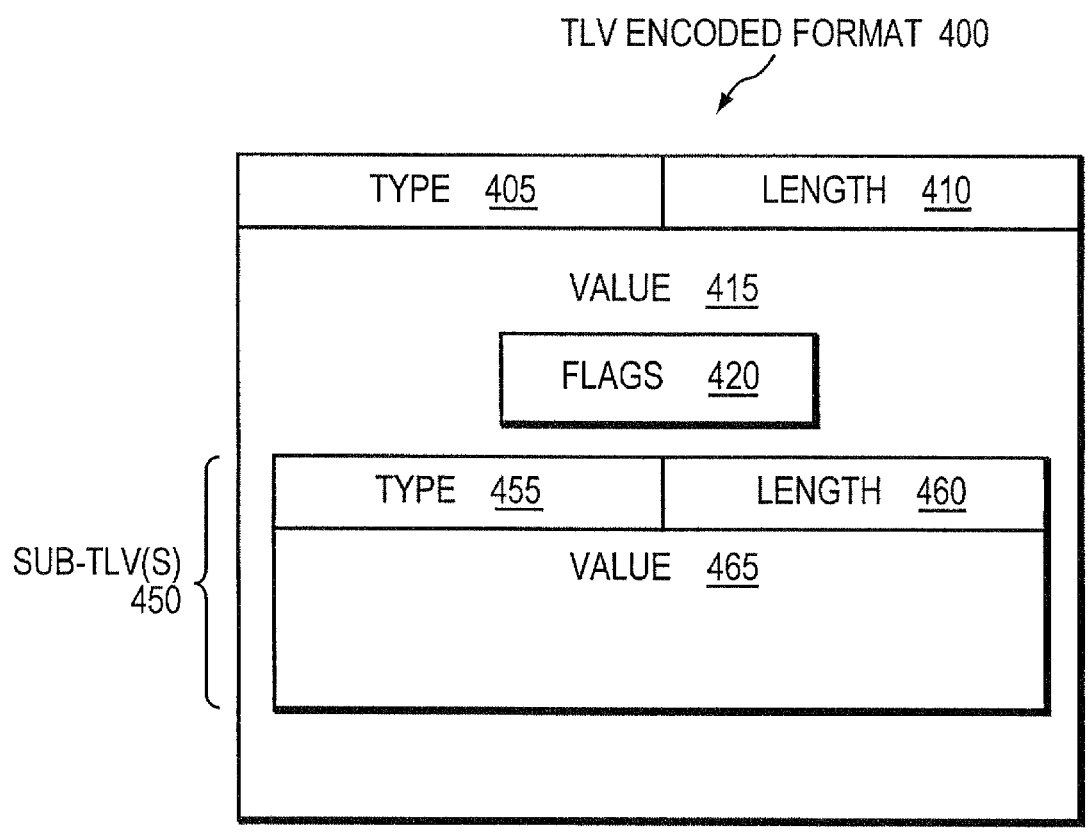
FIG. 4 illustrates an example TLV format.

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein. Notably, for use with OSPF link state advertisements as IGP advertisements 300, TLVs 400 (e.g., in accordance with the embodiments described herein) may be contained within specific types of advertisements (e.g., Router Information advertisements), or with opaque advertisements, as will be understood by those skilled in the art. The use of IS-IS link state packets, therefore, is merely a representative example.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages in accordance with the embodiments described herein. Further, TE services 248 contain computer executable instructions for implementing TE functions in accordance with the embodiments described herein. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE database (TED) 245 may be illustratively resident in memory 240 and used to store TE information provided by the routing protocols, such as IGP, BGP, and/or RSVP (e.g., with TE extensions as described herein). The TED may be illustratively maintained and managed by TE services 244.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

In particular, in accordance with RSVP, to request a data flow (tunnel) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the tunnel. The Path message may contain various information about the data flow including, e.g., traffic characteristics of the data flow. Also in accordance with the RSVP, a receiver establishes the tunnel between the sender and receiver by responding to the sender's Path message with a reservation request (Resv) message. The reservation request message travels upstream hop-by-hop along the flow from the receiver to the sender (i.e., along intermediate nodes). The reservation request message contains information that is used by intermediate nodes along the flow to reserve resources for the data flow between the sender and the receiver, to confirm the attributes of the tunnel, and provide a tunnel label. If an intermediate node in the path between the sender and receiver acquires a Path message or Resv message for a new or established reservation (tunnel) and encounters an error (e.g., insufficient resources, failed network element, etc.), the intermediate node generates and forwards a path or reservation error (PathErr or ResvErr, hereinafter Error) message to the sender or receiver, respectively.

Figure 5:
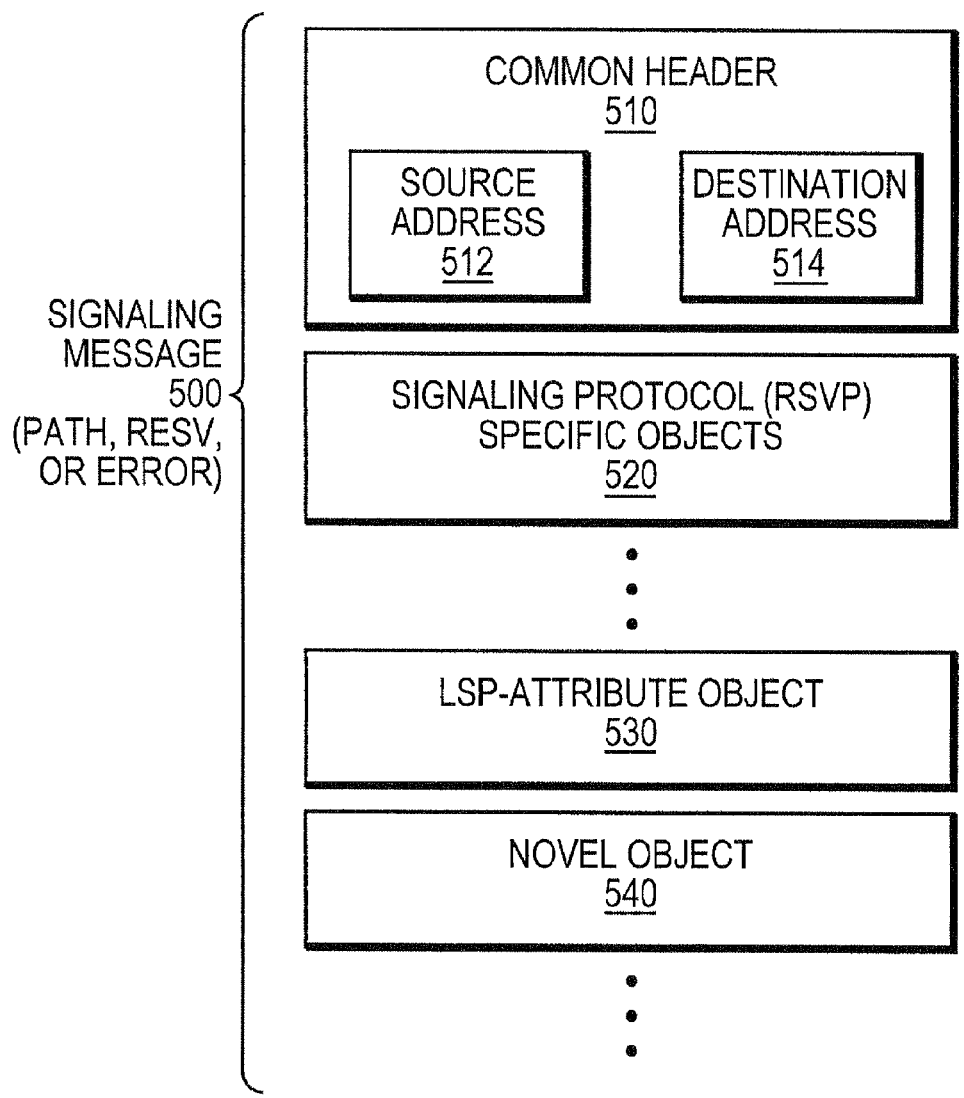
FIG. 5 illustrates an example RSVP message.

FIG. 5 is a schematic block diagram of portions of a signaling message 500 (e.g., RSVP message, such as Path, Resv or Error) that may be advantageously used with the present invention. Message 500 contains, inter alia, a common header 510, one or more signaling protocol specific objects 520, such as an LSP-Attribute object 530, as well as one or more other (e.g., novel) objects 540, described below. The common header 510 may comprise a source address 512 and destination address 514, denoting the origination and requested termination of the message 500. Protocol specific objects 520 contain objects necessary for each type of message 500 (e.g., Path, Resv, Error, etc.). For instance, a Path message may have a sender template object, Tspec object, Previous-hop object, etc. A Resv message, on the other hand, may have specific objects 520 for a label object, session object, filter spec object, etc. Also, Error messages 500 (e.g., PathErr or ResvErr), may also have specific objects 520, such as for defining the type of error, etc. Various flags and/or TLVs 400 may also be contained within the objects 520-540, as will be understood by those skilled in the art.

It should be noted that in accordance with RSVP signaling, the state of the RSVP is refreshed on a timed interval, e.g., every thirty seconds, in which RSVP Path and Resv messages are exchanged. This timed interval is configurable by a system administrator. Moreover, various methods understood by those skilled in the art may be utilized to produce route record objects (RROs) contained in signaling messages for a tunnel.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node (e.g., in a distributed manner, as described herein) or by some other entity operating as a path computation element (PCE) not co-located on the head-end node. Various path computation methodologies are available including CSPF (constrained shortest path first).

Illustratively, with reference again to FIG. 1, head-end nodes A, B, and C have established tunnels T1, T2, and T3, respectively, along paths as shown to tail-end nodes I, F, and F, also respectively. In particular, each tunnel T1-T3 traverses a particular link of network 100, e.g., the link between intermediate nodes D and E ("link D-E").

As noted, distributed CSPF may be used in a network, such that each head-end node of a tunnel computes its own tunnel paths through the network, particularly when rerouting the tunnel due to tunnel preemption and/or failure of a network element (e.g., a node or link). A problem with distributed path computation is that it may be inefficient for optimizing tunnel placement within the network. For example, it has generally not been possible to coordinate the timing, placement, and bandwidth reservation (e.g., reduced yet fair bandwidth allocation) of tunnels using distributed path computation, particularly in the event of a link (or node) becoming unavailable to the tunnels.

Optimization of Distributed Tunnel Rerouting: Intermediate Node Computes Paths/Timestamps According to embodiments of the disclosure, an intermediate node determines a set of one or more tunnels that traverse a particular link of the intermediate node, and computes paths for the set of tunnels that do not include the particular link, the computed path for each tunnel considering each of the tunnels of the set. The intermediate node may then inform respective head-end nodes of the tunnels of the set of the computed paths such that in the event of an inability of the set of tunnels to use the particular link, the head-end nodes may reroute their respective tunnels over the computed paths. Alternatively or in addition, the intermediate node may inform respective head-end nodes of a timestamp to reroute each of their tunnels upon the failure of the network resource in question.

Operationally, a rerouting policy may be configured on an intermediate node (i.e., a node along one or more tunnels), such that the "acting" intermediate node performs certain (re-)routing decisions for affected tunnels, and may send those decisions to head-end nodes having at least one of the affected tunnels. Example rerouting policies may comprise configurable factors such as how to select which tunnels to preempt. For instance, by determining the inability of a head-end node to reroute a preempted tunnel, or by anticipating a preemption cascading effect, etc., the intermediate node may determine which tunnels to preempt to avoid such problems. For example, the intermediate node (e.g., node D) may determine that by preempting tunnels T1 and T2, the head-end node for tunnel T2 (node B) may not be able to find a suitable path using conventional CSPF. However, should the intermediate node preempt tunnels T1 and T3, each head-end node of both tunnels (e.g., node A and node C) should be able to compute acceptable paths upon which to reroute the affected (preempted) tunnels.

Notably, the intermediate node may store a table (600) that lists each tunnel that traverses a particular link of the intermediate node, along with its corresponding head-end node, bandwidth, and priority. In this manner, the intermediate node may determine which tunnels to preempt based on the information stored within the table (e.g., generated through various means, such as Route Record Objects, or "RROs", RSVP and/or TE signaling, etc.). FIG. 6 illustrates an example table 600 that may be used in accordance with one or more embodiments described herein. For example, fields 610 and entries 620 may be populated according to the various embodiments in various manners as described herein and as will be understood by those skilled in the art. In particular, fields 610 may comprise a tunnel identification (ID) field 611, along with corresponding head-end node field 612, bandwidth field 613, and priority field 614, e.g., with entries 620 populated as shown.

As another example of a rerouting policy, the intermediate node may be configured to allow tunnels not otherwise protected (e.g., by Fast Reroute, "FRR") to be rerouted first, as the protected tunnels may already have an alternate (e.g., temporary) path to utilize, while the non-protected paths do not. In other words, there may be less concern for rerouting the protected tunnels as quickly as the non-protected tunnels. For instance, if tunnel T1 is protected by FRR, the intermediate node D may be configured to reroute tunnels T2 and T3 prior to tunnel T1. Other examples of rerouting policies may comprise calculating full paths and providing the full paths to head-end nodes (e.g., as Explicit Route Objects, or "EROs"), determining a specific order to compute the paths for a set of tunnels (e.g., rerouting tunnels T1-T3, only if reroute T2 first, T1 second, and T3 third), etc. Accordingly, based on the rerouting policy (or policies) configured at the intermediate node, two illustrative outputs may occur: 1) an alternate path of each affected tunnel, and/or 2) a timestamp indicating routing timing (i.e., when each tunnel should be rerouted).

According to one or more embodiments described herein, the intermediate node may be configured to proactively prepare for failure of and/or preemption on a particular link, or reactively respond to the failure/preemption. For proactive preparation, the intermediate node may execute path computation for a set of tunnels that traverse a particular link (i.e., rooted at the respective head-end node of the tunnels) prior to unavailability of that link to the set of tunnels. Illustratively, paths may be computed for all tunnels that traverse a link to prepare for failure of that link. For preemptions, however, a subset of the links may be selected for path computation, as described above. For example, the intermediate node may predetermine sets of tunnels to preempt based on various criteria. For instance, various combinations of preempting tunnel size and priority level may result in different predetermined sets of tunnels, such as, e.g., tunnels T2 and T3 in the event of a 150 Mbps (or greater) tunnel at priority 1, tunnels T1 and T2 in the event of a 250 Mbps tunnel at priority 2, etc.

The intermediate node (e.g., node D) performs path computation to optimize paths for the determined set of tunnels on a particular link such that all of the affected tunnels have an acceptable path through the network. The computation may be configured to be fair to all affected tunnels, and to not result in a race condition to obtain network resources. For instance, various computation techniques may be used to attempt to find a solution that has an optimized average cost of all tunnels through the network, and/or a solution having minimum bandwidth scaling (i.e., where no bandwidth scaling implies that all affected tunnels may be placed at their desired bandwidths), etc. The scaling factor(s) used by the head-end nodes is configurable, but is the same on each of the head-end nodes. As examples, the scaling may be applied equally to all tunnels that require scaling (e.g., 1% reduction of all tunnel bandwidths), or may be configured based on the tunnel sizes, e.g., 5% for tunnels above 10 Mbps, 1% for tunnels above 20 Mbps, and/or priorities of the tunnels, e.g., 1% for tunnels with priority "0", 5% for tunnels with priority "1", etc. Note that if one scaling factor does not produce acceptable paths for all tunnels of the subset/list, a greater reducing scaling factor is to be applied, e.g., increasing by a certain amount (e.g., gradually until a solution is found), or to a greater tier of configuration (e.g., changing the scaling factors in a non-linear manner, e.g., maintaining 5% for tunnels over 10 Mbps, but increasing for tunnels over 20 Mbps to 5% as well).

Figure 7A:
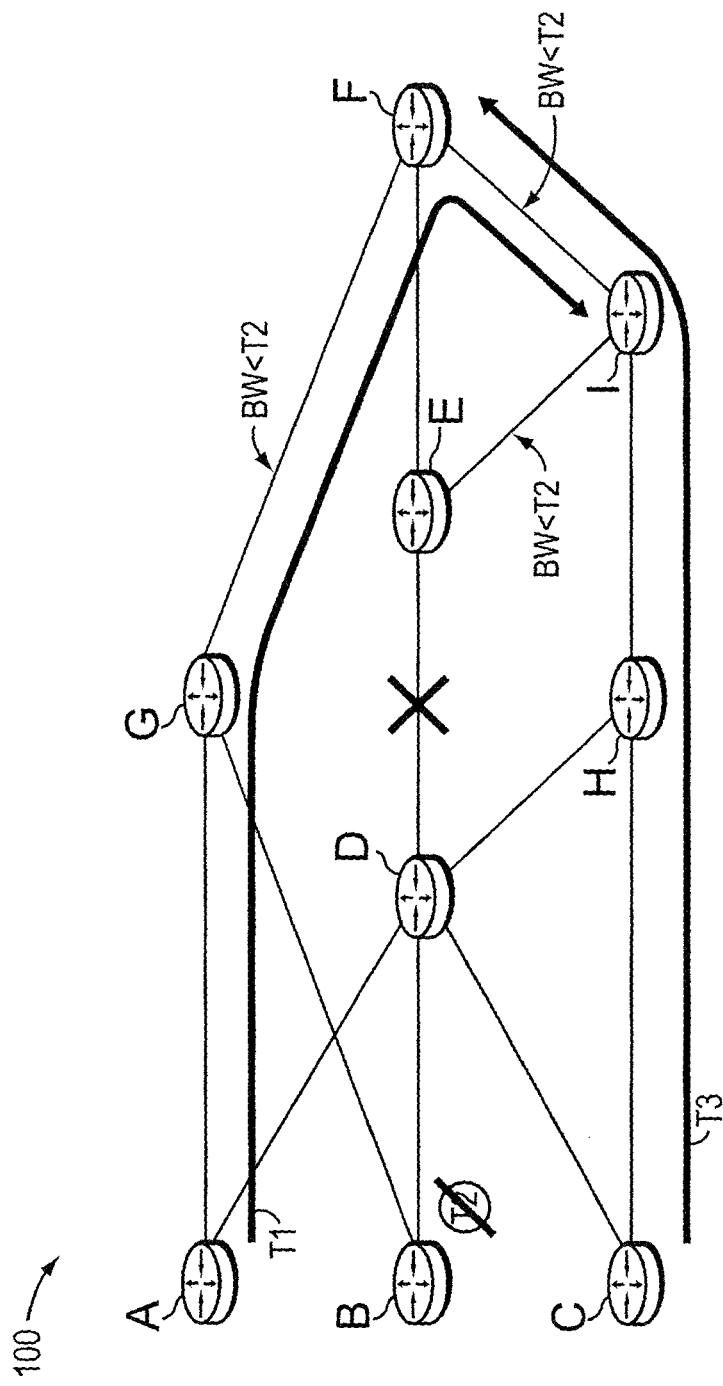
FIGS. 7A-B illustrate an example computer network with optimized distributed tunnel rerouting in accordance with one or more embodiments described herein.
Figure 7B:
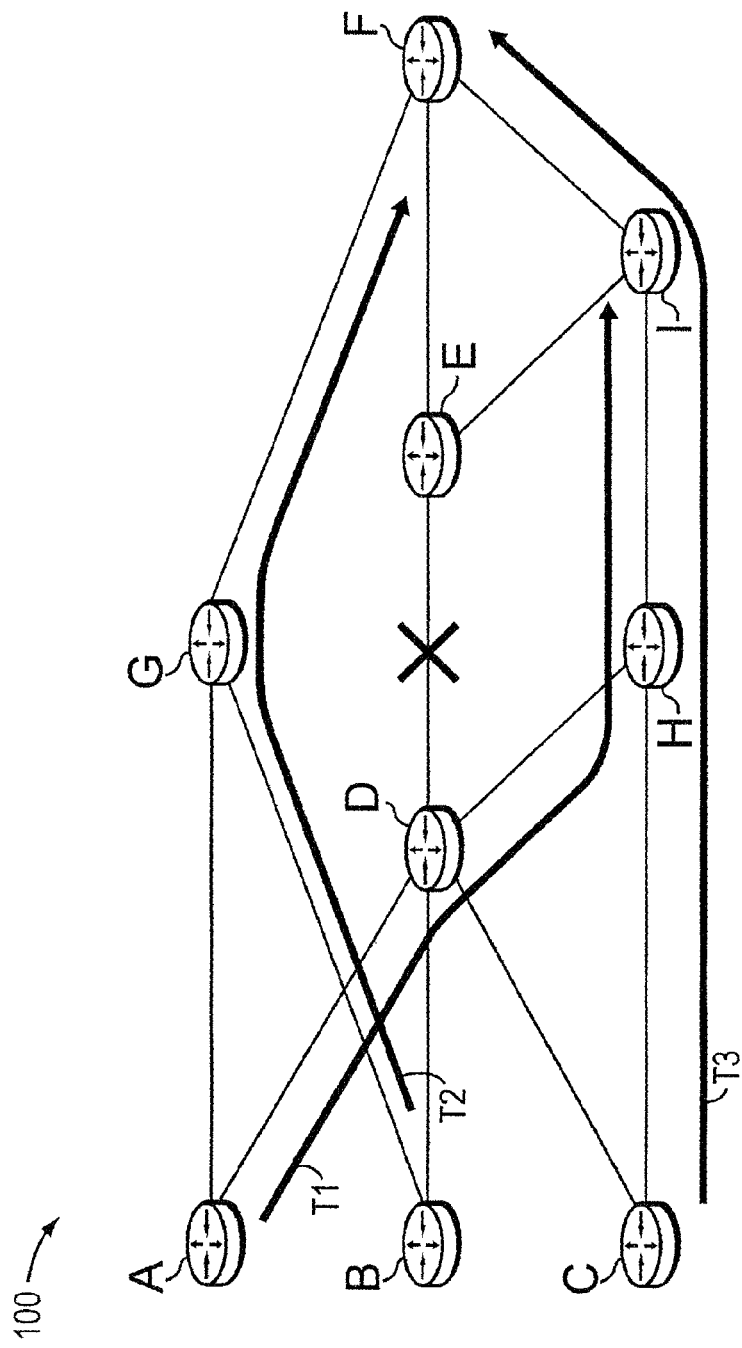

Illustratively, assume that FIG. 7A shows a potential reroute of tunnels in response to a failure of link D-E. Without a coordinated path computation, tunnels T1 and T3 may utilize particular paths that prevent tunnel T2 from finding a suitable path (e.g., where all remaining links to T2's tail-end node F have bandwidth "BW" less than what is needed for T2). Conversely, FIG. 7B shows an example path computation result that may be a result of an intermediate node's (node D's) coordinated path computation of the tunnels over one of its links (link D-E). Notably, through the computation of all tunnel paths at a single intermediate node, tunnel T2 may now have a suitable path to its tail-end node (e.g., by relocating/rerouting tunnel T1 from its path shown in FIG. 7A).

Once the paths for the set of tunnels are computed, the intermediate node may provide the computed paths to the respective head-end nodes accordingly. For example, a novel TLV 400 within the LSP-ATTRIBUTE object 530 of an RSVP Resv message 500 may be utilized to convey the computed paths. The associated link with the computed paths may also be included proactively, such that when that link fails, the head-end nodes may know to use these particular computed paths for the tunnels contained there (i.e., each tunnel may have multiple rerouting options based on which of the particular links fail). By computing the paths at the intermediate node of the particular link of issue, each distributed head-end node receives the benefit of a centrally computed (e.g., coordinated) set of paths to ensure that all tunnel paths to be rerouted will find an acceptable place within the network.

When configured to reactively respond, however, the intermediate node may be configured to perform the determinations and/or computations in response to a failure of or preemption on a particular link. As those skilled in the art will understand, a reactive response may require more time to process a solution, but also demands less memory from the system to store pre-computed values. Notably, one particularly well-suited configuration for reactive response is where FRR is employed, as each tunnel may have a backup path (e.g., temporary) in place while the reactive computations occur. Also, because of the many different possibilities regarding preemption (mentioned above), a proactive preparation may be over burdensome, so a reactive response may be a more optimal configuration. Also, in addition to sending notifications to head-end nodes using the RSVP Resv messages 500 as described above for proactive preparation, the intermediate node may also send notifications to the head-end nodes using RSVP Path Error messages 500, as will be appreciated by those skilled in the art.

In accordance with one or more embodiments described herein, combinations of proactive preparation and reactive response may be utilized accordingly. For instance, the intermediate node may pre-compute the paths/timing/sizes before the failure/preemption, but may maintain this information locally. Once a failure is detected, the intermediate node may then forward the pre-computed information to the head-end nodes accordingly. Alternatively or in addition, multiple path options may be computed for each tunnel, e.g., multiple paths for tunnel T1 (such as shown in FIGS. 7A and 7B above), in preparation of a preemption (or failure). The intermediate node may send these paths to the head-end nodes proactively, or store them locally until needed. In response to a preemption of the particular link, the intermediate node may determine which of the pre-computed paths to use (e.g., the path in FIG. 7A in response to a preemption for 100 Mbps tunnel of priority 1, or the path in FIG. 7B in response to a failure of the link D-E, etc.), and informs the head-end nodes accordingly.

In addition to providing computed paths, in the event the intermediate node determines that a particular order of rerouting tunnels would result in successful rerouting of the tunnels (i.e., placing certain tunnels prior to other tunnels, such as, e.g., larger tunnels before smaller tunnels), the intermediate node may inform the head-end nodes of a particular timestamp, indicating to the head-end nodes at what time (or after expiration of what time) the head-end node should attempt to compute a path and reroute the affected tunnel. For instance, by delaying the rerouting of smaller tunnels, head-end nodes with larger tunnels may be able to find a path for the larger tunnels, where without the specific ordering, the larger tunnels may experience blocking bandwidth fragmentation. The timestamp may apply to place tunnels based on conventional (distributed) CSPF at each of the head-end nodes, or in addition to paths computed by the intermediate node. For example, as mentioned above, rerouting tunnel T2 first, T1 second, and T3 third, may produce the same paths as shown in FIG. 7B, even where the head-end nodes compute the paths independently.

Also, if the intermediate node determines that the affected head-end nodes will be able to compute paths for all of the affected tunnels using conventional path computation (e.g., distributed CSPF), then the intermediate node need not send any messages (e.g., computed paths and/or timestamps). In this case, however, as well as where just the computed path is sent as described above, it may be beneficial to still send a message having a timestamp for each head-end node, e.g., in order to reduce signal burst during tunnel rerouting by multiple head-end nodes. (Notably, in all cases, the head-end nodes may be configured to ignore the messages from the intermediate node, or may be otherwise non-compliant, however such situations may not produce optimal results.)

Notably, particularly for tunnel preemption on a link, the intermediate node may also send the information/notification downstream to other intermediate nodes along each tunnel's preempted path. In this manner, the other intermediate nodes may know which tunnels have been selected for preemption (e.g., tunnels T1 and T3), so that when determining its own set of tunnels to preempt (if any), it may be beneficial to know which tunnels are already selected for preemption (e.g., so excess tunnels need not be preempted).

Figure 8:
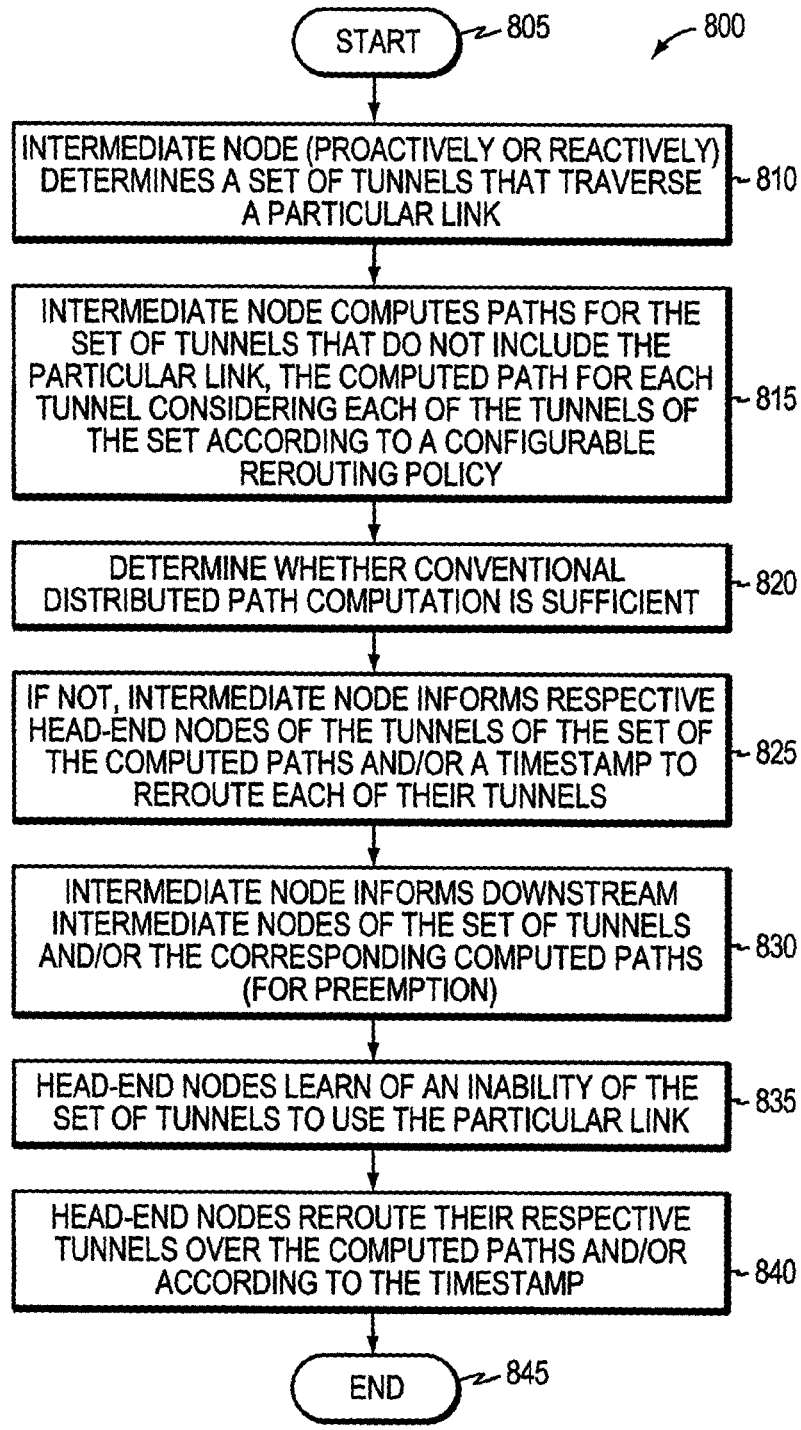
FIG. 8 illustrates an example procedure for optimized distributed tunnel rerouting in accordance with one or more embodiments described herein.

FIG. 8 illustrates an example procedure for optimizing distributed rerouting of tunnels in accordance with one or more embodiments described herein. The procedure 800 starts at step 805, and continues to step 810, where an intermediate node (proactively or reactively) determines a set of tunnels that traverse a particular link. In step 815, the intermediate node computes paths for the set of tunnels that do not include the particular link, the computed path for each tunnel considering each of the tunnels of the set according to a configurable rerouting policy. In step 820, the intermediate node determines whether conventional distributed path computation (e.g., CSPF) is sufficient to find a path for each displaced tunnel. If not, the intermediate node informs respective head-end nodes of the tunnels of the set of the computed paths and/or a timestamp to reroute each of their tunnels in step 825. Note that the intermediate node may also inform downstream intermediate nodes of the set of tunnels and/or the corresponding computed paths (for preemption) in step 830.

In step 835, the head-end nodes learn of an inability of the set of tunnels to use the particular link, such as due to a failure or preemption. (Notably, as described above, the head-end nodes may learn of the failure after receiving the proactively computed paths proactively, or before receiving the reactively computed paths.) In response, the head-end nodes reroute their respective tunnels over the computed paths and/or according to the timestamp in step 840, and the procedure 800 ends in step 845. Further details, modifications, and/or options for procedure 800 are described above.

Advantageously, the novel techniques described herein optimize distributed rerouting of tunnels in a computer network. By having the intermediate node of the affected link compute paths/timestamps/bandwidth scaling for rerouting affected tunnels, the novel techniques allow for more efficient rerouting of tunnels in response to preemption or failure based on all affected tunnels in order to maximize tunnel placements. In particular, the techniques described above may advantageously minimize preemption cascading and signal burst, as well as provide configurable rerouting policies, such as rerouting non-protected tunnels before FRR-protected tunnels, etc. Also, the dynamic aspects of one or more embodiments described herein alleviate the need for cumbersome and inefficient manual configuration.

While there have been shown and described illustrative embodiments that optimize distributed rerouting of tunnels in a computer network, it is to be understood that various other adaptations and modifications may be made within the spirit and scope of the present invention. For example, the embodiments have been shown and described herein relating to various protocol messages and fields, e.g., IGP and/or RSVP and related fields, etc. However, the embodiments of the invention in their broader sense are not so limited, and may, in fact, be used with other messaging/notification protocols or other fields, such as proprietary or application specific protocols, or other fields (e.g., TLVs) within the messages described herein, as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   determining a set of two or more tunnels that traverse a particular link connected to an intermediate node in a network;
   computing in a coordinated path computation, by the intermediate node, paths for tunnels of the set of tunnels that do not include the particular link, the coordinated path computation considering each of the tunnels of the set of tunnels;
   concluding that if one or more tunnels of the set of tunnels are preempted, respective head-end nodes of the one or more tunnels would be unable to reroute at least one of the one or more tunnels;
   selecting, by the intermediate node, one or more other tunnels of the set of tunnels for preemption, the one or more other tunnels selected as tunnels that are reroutable by respective head-end nodes of the one or more other tunnels; and
   sending a notification to one or more other intermediate nodes that informs the one or more other intermediate nodes of the one or more other tunnels selected for preemption.

2. The method of claim 1, wherein the one or more other intermediate nodes are downstream intermediate nodes located between the intermediate node and respective tail-end nodes of the one or more other tunnels.

3. The method of claim 1, further comprising:
   informing the respective head-end nodes of the computed paths.

4. The method of claim 3, further comprising:
   routing, by the respective head end nodes of the set of tunnels, the set of tunnels over the computed paths in response to an inability of all the tunnels of the set of tunnels to use the particular link.

5. The method of claim 1, further comprising:
   storing, at the intermediate node, a data structure that includes a tunnel identifier (ID) for each tunnel of the set of tunnels and an indication of the tunnel's head-end node.

6. The method of claim 5, wherein the data structure further includes an indication of bandwidth of each tunnel of the set of tunnels or an indication of priority of each tunnel of the set of tunnels.

7. The method of claim 1, wherein the respective head-end nodes of the one or more tunnels would be unable to reroute the at least one of the one or more tunnels due to a preemption cascading effect.

8. The method of claim 1, further comprising:
   proactively performing the computing and the sending prior to an inability of all the tunnels of the set of tunnels to use the particular link.

9. The method of claim 1, further comprising:
   reactively performing the computing and the sending in response to an inability of all the tunnels of the set of tunnels to use the particular link.

10. The method of claim 1, further comprising:
    applying a bandwidth scaling factor to the computed paths.

11. The method of claim 1, wherein the set of tunnels is a subset of all tunnels that traverse the particular link.

12. An apparatus comprising:
    a plurality of network interfaces, at least one of the network interfaces connected to a particular link;
    one or more processors coupled to the network interfaces and configured to execute one or more processes; and
    a memory configured to store a rerouting process executable by the one or more processors, the rerouting process when executed operable to:
        determine a set of two or more tunnels that traverse the particular link,
        compute, in a coordinated path computation, paths for tunnels of the set of tunnels that do not include the particular link, the coordinated path computation considering each of the tunnels of the set of tunnels,
        conclude that if one or more tunnels of the set of tunnels are preempted, respective head-end nodes of the one or more tunnels would be unable to reroute at least one of the one or more tunnels, and
        select one or more other tunnels of the set of tunnels for preemption, the one or more other tunnels selected as tunnels that are reroutable by respective head-end nodes of the one or more other tunnels.

13. The apparatus of claim 12, wherein the rerouting process when executed is further operable to send a notification to one or more intermediate nodes that informs the one or more intermediate nodes of the one or more other tunnels selected for preemption.

14. The apparatus of claim 13, wherein the one or more other intermediate nodes are downstream intermediate nodes located between the apparatus and tail-end nodes of the one or more other tunnels.

15. The apparatus of claim 12, wherein the rerouting process when executed is further operable to inform the respective head-end nodes of the computed paths.

16. The apparatus of claim 12, wherein the memory is further configured to store a data structure that includes a tunnel identifier (ID) for each tunnel of the set of tunnels and an indication of the tunnel's head-end node.

17. The apparatus of claim 16, wherein the data structure further includes an indication of bandwidth priority of each tunnel of the set of tunnels or an indication of priority of each tunnel of the set of tunnels.

18. The apparatus of claim 12, wherein the respective head-end nodes of the one or more tunnels would be unable to reroute the at least one of the one or more tunnels due to a preemption cascading effect.

19. The apparatus of claim 12, wherein the set of tunnels is a subset of all tunnels that traverse the particular link.

20. A non-transitory computer readable media having instructions encoded thereon that when executed by one or more processors are operable to:
- determine a set of two or more tunnels that traverse a particular link connected to an intermediate node in a network;
- compute, in a coordinated path computation, paths for tunnels of the set of tunnels that do not include the particular link, the coordinated path computation considering each of the tunnels of the set of tunnels;
- conclude that if one or more tunnels of the set of tunnels are preempted, respective head-end nodes of the one or more tunnels would be unable to reroute at least one of the one or more tunnels;
- select one or more other tunnels of the set of tunnels for preemption, the one or more other tunnels selected as tunnels that are reroutable by respective head-end nodes of the one or more other tunnels; and
- send a notification to one or more other intermediate nodes that informs the one or more other intermediate nodes of the one or more other tunnels selected for preemption.

\* \* \* \* \*